United States Patent [19]

Teumac et al.

[11] Patent Number: 4,818,775

[45] Date of Patent: Apr. 4, 1989

[54] RAPID CURE OF POLYURETHANE FOAM WITH AMMONIUM CONTAINING MATERIALS

[75] Inventors: Fred N. Teumac, Spartanburg, S.C.; Michael A. Ricciardi, Statesville, N.C.; Ronald L. Murph; Gregory W. Howard, both of Charlotte, N.C.

[73] Assignee: Reeves Brothers, Inc., Spartanburg, S.C.

[21] Appl. No.: 52,815

[22] Filed: May 21, 1987

[51] Int. Cl.$^4$ .............................................. C08G 18/30
[52] U.S. Cl. .................... 521/107; 521/110; 521/122; 521/128; 521/137
[58] Field of Search ............... 521/107, 110, 122, 128, 521/137

[56] References Cited

U.S. PATENT DOCUMENTS

| | | | |
|---|---|---|---|
| 2,681,273 | 8/1972 | Jelly | 260/2.5 |
| 3,297,597 | 1/1967 | Edwards, et al. | 260/2.5 |
| 3,455,850 | 7/1969 | Saunders | 260/2.5 |
| 3,658,972 | 4/1972 | Ready et al. | 264/52 |
| 3,709,843 | 1/1973 | Zocco et al. | 260/2.5 AN |
| 3,803,063 | 4/1974 | Krentz, Jr. | 260/2.5 AJ |
| 4,066,578 | 1/1978 | Murch et al. | 260/2.5 AG |
| 4,098,729 | 7/1978 | Kollmeier et al. | 521/128 |
| 4,165,411 | 8/1979 | Marans et al. | 521/107 |
| 4,230,822 | 10/1980 | Murch et al. | 521/106 |
| 4,246,146 | 1/1981 | Woods et al. | 260/9 |
| 4,438,028 | 3/1984 | Schmittmann et al. | 252/609 |
| 4,467,056 | 8/1984 | Staendeke et al. | 523/208 |
| 4,511,546 | 4/1985 | Schrodter et al. | 423/305 |
| 4,515,632 | 5/1985 | Maurer et al. | 106/18.16 |
| 4,537,912 | 8/1985 | Griswold | 521/53 |

FOREIGN PATENT DOCUMENTS

| | | |
|---|---|---|
| 3407007 | 8/1985 | Fed. Rep. of Germany . |
| 3411327 | 10/1985 | Fed. Rep. of Germany . |
| 1029963 | 5/1966 | United Kingdom . |
| 1030162 | 5/1966 | United Kingdom . |
| 1462859 | 1/1977 | United Kingdom . |
| 1463069 | 2/1977 | United Kingdom . |
| 2094315 | 9/1982 | United Kingdom . |

OTHER PUBLICATIONS

Solodovnik et al., Effect of Fillers on Physico-Mechanical Properties and Flammability of Polyurethane Foam, (1983).

Primary Examiner—John Kight
Assistant Examiner—S. A. Acquah
Attorney, Agent, or Firm—Pennie & Edmonds

[57] ABSTRACT

Methods for rapidly curing flexible polyether-derived foam in situ by adding to the foam forming composition an ammonia containing material having a decomposition temperature below the temperature of the highest reaction exotherm of the foam-forming composition and decomposing the ammonia containing material by exposure to the heat of the exotherm produced by reaction of the foam-forming components to release ammonia to cure the foam by contact therewith.

24 Claims, No Drawings

4,818,775

RAPID CURE OF POLYURETHANE FOAM WITH AMMONIUM CONTAINING MATERIALS

TECHNICAL FIELD

The invention relates to a method for rapidly curing polyurethane foam wherein ammonia is released from ammonia containing materials which at least partially decompose when exposed to the heat generated by reaction of the foam forming components.

BACKGROUND ART

Polyurethane foam is prepared commercially in the form of large blocks that are subsequently cut into the desired shape for use in the manufacture of various articles that require a foam padding. It is well known that polyurethane foam requires time to cure and develop its full physical properties. In typical polyurethane foam formulations, a polyhydroxy material ("polyol"), water and an organic isocyanate compound are reacted in the presence of catalysts or other additives. Much of the time, a small percentage of terminal isocyanate groups are left unreacted in the foam structure. If the foam is distorted or compressed in this condition, it fails to recover its original dimensions when the distorted or compressive force is released. Normally, the terminal isocyanate groups that are left unreacted in the foam structure will react with the residual water in the foam structure or with the water vapor in the atmosphere over a period of several hours or days, and the foam will ultimately achieve its full physical properties.

As pointed out in the Encyclopedia of Polymer Science and Technology (John Wiley and Sons, New York 1969) in the section on Polyurethanes, polyethers are commercially the most important of the polyols used to prepare polyurethanes. At the present time most of the polyethers used in the production of flexible polyurethane foams are derived from propylene oxide and ethylene oxide. In this preparation, propylene oxide is reacted with glycerol in the presence of a basic catalyst to form a poly(oxypropylene) homopolymer which is further reacted with ethylene oxide to form a block copolymer.

Post-curing of polyether derived foam by exposure to a mixture of water vapor and gaseous ammonia, primary or secondary amines at temperatures of about 50° to 150° F. for a period of at least one minute is disclosed in U.S. Pat. No. 4,537,912. While this process effectively and rapidly cures the foam, it constitutes an additional step beyond those normally used in the foam manufacturing process. This process also requires storage of the foam prior to the post-curing treatment. It is more desirable to cure the foam as it is manufactured to reduce or even eliminate such storage time and to prepare a fully cured foam material which can be immediately shipped to the end users after cutting to the desired shapes. The present invention provides one solution to this problem in that a one-step foaming and curing process is disclosed herein. This process achieves a rapid and full post cure of the foam so that the foam will exhibit low compression set values as measured by ASTM standard test D-3574 (Constant Deflection Compression Set Test), with the elimination of post curing steps.

SUMMARY OF THE INVENTION

The present invention relates to a method for the rapid curing of flexible polyether-derived foam without adversely affecting the resulting physical properties of the foam. This method includes the steps of adding to a foam forming composition of a polyether polyol, an organic isocyanate compound and water, an ammonia containing material having a decomposition temperature below the temperature of the highest reaction exotherm of the foam-forming composition; forming the foam by reaction of the foam-forming components thereby generating heat; and at least partially decomposing the ammonia containing material by exposure to the generated heat to release ammonia to cure the foam by contact therewith.

The ammonia containing material can be an ammonium salt, an encapsulated ammonia containing material, or certain ammonia containing zeolites, each of which are relatively insoluble in the polyol and preferably have a decomposition temperature of at least about 225° F. and up to about 300° F. Alternately, other ammonia containing compounds which have a higher solubility in the polyol or which have lower decomposition temperatures can be encapsulated so that the compound is prevented from affecting the reaction mixture until the heat generated by the exotherm breaks through the encapsulation and allows the ammonia to be generated at the appropriate time during the manufacturing process to cure the foam.

DETAILED DESCRIPTION OF THE PREFERRED EMBODIMENTS

Ammonia and, alternatively, primary and secondary amines, with or without the presence of moisture or moisture vapor, are effective in causing the completion of cure of any active chemical components which remain in the foam after the foam forming reactions. Ammonia would, however, also interfere with the complex reactions that occur during the initial production of foam, and for this reason cannot simply be added to the foam forming components. This invention provides new and different methods for releasing ammonia in the foam during the foam forming process but after the initial foam forming reactions have occurred.

The term "polyether polyurethane" as used throughout this application refers to polyurethanes derived by polyether polyols. This class would include the poly(oxytetramethylene) glycols which are prepared by the polymerization of tetrahydrofuran. Poly(oxypropylene) triols are another important group of polyethers used in the manufacture of polyurethanes which are included in this class. These triols are prepared by the same general reactions as poly(oxypropylene) glycols. The polyurethanes derived from polyesters do not normally present post-curing problems and thus do not form part of this invention.

The term "organic isocyanate compound" is used to describe the isocyanate or polyisocyanate compounds that are suitable for use in this invention. Such organic isocyanate compounds include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3-dimethoxy-4,4'-biphenyl diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4''-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred crude isocyanates are disclosed in U.S. Pat. No. 3,215,652.

The polyurethane foams employed in the present invention are generally prepared by the reaction of the polyether polyol with the organic isocyanate compound in the presence of a blowing agent such as water and, optionally, in the presence of additional polyhydroxyl-containing components, chain-extending agents, catalysts, surface-active agents, stabilizers, dyes, fillers and pigments. The preparation of cellular polyurethane plastic foam is well known in the art. Corresponding quantities of excess isocyanate compound are used to react with a blowing agent, generally water.

It is also possible to proceed with the preparation of the polyurethane plastics by a prepolymer technique wherein an excess of the organic isocyanate compound is reacted in a first step with the polyol of the present invention to prepare a prepolymer having free isocyanate groups which is then reacted in a second step with water and/or additional polyols to prepare a foam. Alternatively, the components may be reacted in a single working step commonly known as the "one-shot" technique of preparing polyurethanes.

After the initial formation of the foam, an exotherm is generated due to the reaction of the foam forming components. The temperature of the exotherm usually ranges from about 225° to 350° F. Thus, the invention resides in the discovery that ammonia containing compounds or materials which decompose at the temperature generated by the reaction exotherm enable ammonia to be released in the foam after the initial foam forming reactions have occurred so as to cure the foam in situ.

It is known from U.S. Pat. No. 4,537,912 that the presence of moisture with ammonia or amines causes the curing of the foam to occur very rapidly. In the current invention, the ammonia is supplied by the ammonia containing compounds and the foam gains sufficient moisture from the formulation and/or atmosphere, particularly on days of high relative humidity, to achieve this rapid cure. When the relative humidity is very low, moisture generating salts can be added along with the ammonia containing compounds to the foam forming components to release both moisture and ammonia by exposure to the exotherm temperature.

By binding or preventing the release of ammonia until the exotherm, the foam forming reaction proceeds without interruption. The ammonia can be bound by a number of methods. One way is to utilize ammonia containing compounds which are relatively insoluble in the polyol and which preferably have a decomposition temperature above 225° F. and up to about 300° F. Compounds having a decomposition temperature between 275° and 300° F. are most advantageous. Such compounds include ammonium orthophosphate, monohydrogen (decomposition temperature 300° F.), ammonium citrate (277° F.), and ammonium oxalate (285° F.). Also, a number of ammonium polyphosphates are suitable: these compounds are fully described in U.S. Pat. No. 4,515,632, the content of which is expressly incorporated by reference herein. Of all these compounds, the ammonium polyphosphates are preferred because they are relatively insoluble in the polyol and the mixture of foam forming components. Such water-insoluble ammonium polyphosphates are disclosed in U.S. Pat. No. 4,511,546, the content of which is expressly incorporated by reference herein.

Compounds which have lower decomposition temperatures (i.e., between 175° and 225° F.) or which are soluble in the polyol or the mixture of foam forming components have been found to interfere with the foam-forming reaction because the ammonia is released too early. Although the solubility of such compounds in various polyether polyols is not known, it appears that the polyol solubility parallels that of the compound in water. Therefore, ammonia containing compounds which are completely water soluble, by themselves, are not suitable for use in the invention. Other ammonium compounds having a lower degree of solubility in water can be routinely tested to determine if they provide suitable performance in the process of this invention. Generally, those which are relatively insoluble in water should provide satisfactory results.

In order to utilize the relatively water-soluble ammonia containing compounds, an encapsulating resin material that decomposes or breaks down at the exotherm temperatures is used, so that ammonia containing compounds are not exposed until the exotherm is achieved to then release the ammonia and cure the foam. Suitable compounds for encapsulation include ammonium carbonates, carbamates, phosphates, phosphonates and the like. Specific examples of these compounds are well know in the art and would include, for example, those described in U.S. Pat. No. 4,066,578, the content of which is expressly incorporated by reference herein. A commercial ammonium polyphosphate product of Monsanto, PHOSCHEK P-30, when encapsulated with a suitable resin, is another example of this type compound. The water-soluble ammonium salts of various organic acids, when encapsulated, are also useful in the process of this invention.

A number of commercial products based on encapsulated ammonium polyphosphates are available from Hoechst under the tradename EXOLIT: these compounds are described in U.S. Pat. No. 4,467,056, the content of which is also expressly incorporated by reference herein. The solubility of the polyphosphates is reduced by the encapsulation by an epoxy or melamine-formaldehyde resin. These resins are also suitable for encapsulation of the other low decomposition temperature ammonia containing compounds described above. Specifically, EXOLIT 422, 455 and 462 are preferred for use in the processes of the present invention.

A further class of suitable materials includes the ammonia containing zeolites. The P.Q. Corporation, Valley Forge, PA, markets a product known as $NH_4NaA$ Zeolite, which has no free ammonia at room temperature, but which loses 10–20 percent by weight at 300° F. due to ammonia and water release.

Although the use of a single ammonia containing material is preferred from the standpoint of simplicity of formulation, mixtures of two or more of the same type or of different types also are suitable in achieving the results of the invention, and such mixtures are included in the scope of this invention.

As noted above, for periods of low relative humidity, the addition of a source of moisture may be desirable. Such sources include: water, steam, microencapsulated water, or other water generating compounds. Also, the zeolite materials described above release water during exposure to the exotherm temperatures, and are preferred for use under low humidity conditions.

With the exception of the zeolite materials, these ammonia containing compounds also have some utility as flame retardant additives for the foam. Therefore, it may be possible to reduce the amounts of other flame retardant additives when these compounds are used, thus providing an additional advantage for foam produced by these processes.

Other additives which may be incorporated into to these form foaming compositions are well known to those skilled in the art, and would include, for example, catalysts, chain extending agents, surfactants or surface active agents, and/or flame retardant additives.

Suitable flame retardants for use in the composition of the invention include those which are conventionally used in the art of making flexible, flame retardant polyurethane foams, such as tri-esters of phosphoric acid, halogenated triesters of phosphoric acid, halogenated hydrocarbons, and the like.

Specific examples of such suitable flame retardants are: tris(1,3-dichloropropyl)phosphate, tris(2,3-dibromopropyl)phosphate, 2,2-bis(chloromethyl)-1,3 propylene bis[di(2-chloroethyl)phosphate], tris(2-chloroethyl)phosphate, tris(2-chloroprophyl)phosphate, bis(dichloropropyl)tribromoneopentyl phosphate, tetrakis(2-chloroethyl)ethylene diphosphate (sold by Olin Chemicals as THERMOLIN®101), FYROL® EFF(oligomeric chloroalkyl phosphate, sold by Stauffer Chemical Co.), tricresyl phosphate, cresyl diphenyl phosphate, chlorinated paraffin, and brominated paraffin. Halogenated phosphates are generally preferred as flame retardant additives in polyether polyurethane foams of the invention, especially tris(1,3-dichloropropyl)phosphate, tris(2-chloroethyl)phosphate, FYROL® EFF, and tetrakis(2-chloroethyl)ethylene diphosphate, with the first and last-named being particularly preferred.

Although a single flame retardant is preferred from the standpoint of simplicity of formulation, mixtures of two or more of the same type or of different types may be found to give improved performance in some cases, and such mixtures may be included in the foams of this invention. The amount of flame retardant additive or mixture can be varied over a wide range, from about 8 to about 60 parts by weight per 100 parts by weight of polyol in the foam forming composition. It is preferred to use from about 8 to about 20 parts by weight.

Chain-extending agents which may be employed in the preparation of the polyurethane foams of the invention include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)ethylenediamine, N'N-di(2-dydroxypropyl)ethylenediamine, piperazine, and 2-methylpiperazine.

Any suitable catalyst or combination of catalysts may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts include, for example, stannous octoate, stannous chloride, dibutyltin di-2-ethyl hexanoate, stannous oxide, as well as other organometallic compounds such as are disclosed in U.S. Pat. No. 2,846,408.

A surfactant or surface-active agent is generally necessary for production of high grade polyurethane foam according to the present invention, since in the absence of same, the foams may collapse or contain very large uneven cells. Numerous surface-active agents have been found satisfactory, with nonionic surface active agents being preferred. Of these, the well-known silicones have been found to be particularly advantageous. Other surface-active agents which are operative, include polyethylene glycol ethers of long chain alcohols, tertiary amine or alkanolamine salts of long chain alkyl acid sulfate esters, alkyl sulfonic esters, and alkyl arylsulfonic acids.

EXAMPLES

The scope of the invention is further described in connection with the following examples which are set forth for the sole purpose of illustrating the preferred embodiments of the invention and which are not to be construed as limiting the scope of the invention in any manner. In these examples, all parts given are by weight unless otherwise specified, while the density values are reported in pounds per cubic feet, the porosity values in cubic decimeters per second and the compression set values in percent recovery as defined in ASTM D-3574.

EXAMPLE 1

(Comparative) Control samples A through H were prepared from the following formulation:

| Component | parts by weight |
| --- | --- |
| polyether polyol* (3000 mw) | 100.00 |
| toluene diisocyanate (80/20) | 51.70 |
| water | 4.20 |
| stannous octoate catalyst | 0.32 |
| silicone surfactant | 1.10 |
| amine catalyst | 0.40 |
| conventional fire retardant additives | 8.21 |

*Polyol 3010 from Dow Chemical

Foam samples were prepared at 70° F., and the following properties were measured:

| Property | A | B | C | D | E | F | G | H | Average |
|---|---|---|---|---|---|---|---|---|---|
| Density | 1.56 | 1.57 | 1.52 | 1.54 | 1.54 | 1.54 | 1.48 | 1.54 | 1.53 |
| Porosity | 2.5 | 3.1 | 3.5 | 3.3 | 3.5 | 3.3 | 3.6 | 3.3 | 3.3 |
| Compression Set | 82.6 | 84.1 | 85.6 | 85.5 | 81.7 | 85.8 | 82 | 85.8 | 84.1 |

EXAMPLES 2-5

To the control formulation of Example 1, 1.0, 1.5, 1.8 and 2.0 parts of ammonium orthophosphate, monohydrogen were added to prepare the foam samples of Examples 2 through 5, respectively. These samples were also prepared at 70° F., and the following properties were measured. The result for Example 2 are the average of two tests, while the results for Example 3 are the average of three tests.

|  | Example | | | |
|---|---|---|---|---|
| Property | 2 | 3 | 4 | 5 |
| Density | 1.56 | 1.55 | 1.58 | 1.62 |
| Porosity | 3.4 | 3.6 | 3.6 | 3.1 |
| Compression Set | 8.03 | 7.5 | 5.6 | 9.4 |

EXAMPLES 6-8

To the control formulation of Example 1, 1.0, 1.5, and 2.0 parts of NH$_4$NaA Zeolite were added to prepare the foam samples of Examples 6, 7 and 8, respectively. These samples were prepared at 70° F. as in the preceding examples, and the following properties were measured:

|  | Example | | |
|---|---|---|---|
| Property | 6 | 7 | 8 |
| Density | 1.52 | 1.53 | 1.53 |
| Porosity | 2.2 | 2.2 | 1.5 |
| Compression Set | 7.4 | 5.6 | 8.7 |

EXAMPLES 9-11

To the control formulation of Example 1, 1.0, 1.5 and 2.0 parts of Exolit 462 were added to prepare the foam samples of Examples 9, 10 and 11, respectively. These samples were also prepared at 70° F. and the following properties were measured. The results for Example 10 are an average of two samples.

|  | Example | | |
|---|---|---|---|
| Property | 9 | 10 | 11 |
| Density | 1.43 | 1.48 | 1.46 |
| Porosity | 3.6 | 4.0 | 3.1 |
| Compression Set | 5.6 | 5.8 | 7.3 |

In each of the preceding examples, the properties were determined from the middle section of the foam sample when measured at 4.5 hours after foam formation. Also, the samples were wrapped while aging.

EXAMPLE 12

(Comparative) Nine control samples (I through Q) were prepared from the following formulation:

| Component | Parts by Weight |
|---|---|
| polyether polyol* (3000 mw) | 100.00 |
| toluene diisocyanate (80/20) | 49.7 |
| water | 4.0 |
| stannous octoate catalyst | 0.27 |
| silicone surfactant | 1.0 |
| amine catalyst | 0.35 |
| conventional fire retardant additives | 8.2 |

*Polyol 3010 from Dow Chemical

Foam samples were prepared at ambient temperature (i.e., 74°-78° F.), and the following properties were measured:

| Property | I | J | K | L | M | N | O | P | Q | Average |
|---|---|---|---|---|---|---|---|---|---|---|
| Density | 1.62 | 1.63 | 1.61 | 1.55 | 1.58 | 1.61 | 1.62 | 1.57 | 1.60 | 1.60 |
| Porosity | 5.2 | 4.6 | 4.8 | 4.4 | 3.7 | 3.6 | 3.1 | 4.6 | 3.9 | 4.2 |
| Compression | 87.8 | 87.4 | 86.3 | 81.7 | 86.6 | 82.4 | 87.4 | 85.9 | 84.3 | 85.5 |

These properties were determined from the middle section of foam samples which were wrapped while aging. Foam I properties were determined 3 hours after foam formation; foams J and K at 4 hours, and the remaining foams at 2.5 hours.

EXAMPLES 13-15

To the control formulation of Example 12, 1.8 parts of ammonium tartrate were added to prepare the foam of Examples 13-15. These samples were prepared at 75°, 74° and 78° F., respectively, and the following properties were measured.

|  | Example | | | |
|---|---|---|---|---|
| Property | 13 | 14 | 15 | Avg. |
| Density | 1.66 | 1.62 | 1.62 | 1.64 |
| Porosity | 5.6 | 5.1 | 5.1 | 5.3 |
| Compression Set | 6.3 | 6.7 | 8.7 | 7.2 |

The properties of the foam of Example 13 were measured 3 hours after foam formation, while the properties of the foams of Examples 14 and 15 were measured at 4 hours.

EXAMPLES 16-18

To the control formulation of Example 12, 1.8 parts of ammonium citrate were added to prepare the foams of Examples 16-18. These samples were prepared at 76°, 76° and 75° F., respectively, as in the preceding examples, and the following properties were measured 2.5 hours after foam formation.

|  | Example | | | |
|---|---|---|---|---|
| Property | 16 | 17 | 18 | Avg. |
| Density | 1.55 | 1.62 | 1.59 | 1.59 |
| Porosity | 3.8 | 4.9 | 4.2 | 4.3 |
| Compression Set | 8.1 | 9.6 | 10.2 | 9.3 |

EXAMPLES 19-21

To the control formulation of Example 12, 1.8, parts of ammonium oxalate were added to prepare the foams of Examples 19-21. These samples were prepared at 76°, 76° and 75° F., respectively, as in the preceding examples, and the following properties were measured 2.5 hours after foam formation.

|  | Example | | | |
|---|---|---|---|---|
| Property | 19 | 20 | 21 | Avg. |
| Density | 1.57 | 1.58 | 1.57 | 1.57 |
| Porosity | 1.9 | 3.2 | 2.6 | 2.6 |
| Compression Set | 10.4 | 9.8 | 9.9 | 10.0 |

EXAMPLES 22-24

To the control formulation of Example 12, 1.8 parts of ammonium succinate were added to prepare the foams of Examples 22-24. These samples were prepared at 75°, 74° and 78° F., respectively, as in the preceding examples, and the following properties were measured.

|  | Example | | | |
|---|---|---|---|---|
| Property | 22 | 23 | 24 | Avg. |
| Density | 1.64 | 1.60 | 1.60 | 1.61 |
| Porosity | 3.7 | 4.6 | 4.3 | 4.2 |
| Compression Set | 11.9 | 6.7 | 10.1 | 9.6 |

The properties of the foam of Example 22 were measured 3 hours after foam formation, while the properties of the foams of Examples 23 and 24 were measured at 4 hours.

EXAMPLES 25-27

To the control formulation of Example 12, 1.8 parts of Exolit 455 were added to prepare the foams of Examples 25-27. These samples were prepared at 76°, 76° and 75° F., respectively, and the following properties were measured 2.5 hours after foam formation.

|  | Example | | | |
|---|---|---|---|---|
| Property | 25 | 26 | 27 | Avg. |
| Density | 1.54 | 1.54 | 1.59 | 1.56 |
| Porosity | 5.1 | 3.9 | 4.6 | 4.2 |
| Compression Set | 4.4 | 4.3 | 5.6 | 4.7 |

These examples illustrate the improvement in the compression set of the foam by the addition of the ammonia containing compounds compared to the control samples.

While it is apparent that the invention herein disclosed is well calculated to fulfill the objects above stated, it will be appreciated that numerous modifications and embodiments may be devised by those skilled in the art, and it is intended that the appended claims over all such modifications and embodiments as fall within the true spirit and scope of the present invention.

What is claimed is:

1. A method for the rapid cure of flexible polyether-derived polyurethane foam without adversely affecting the resultant physical properties of said foam, which method comprises:
    adding to a foam forming composition comprising components of a polyether polyol, an organic isocyanate compound, and water in an amount sufficient to act as a blowing agent, an ammonia containing material having a decomposition temperature below the temperature of the highest reaction exotherm of the foam-forming composition;
    forming the foam by reaction of the foam-forming components, thereby generating heat and forming a flexible foam structure which includes therein a small number of unreacted thermal isocyanate groups; and
    at least partially decomposing said ammonia containing material by exposure to said heat to release ammonia to react with said unreacted isocyanate groups, thus curing the foam.

2. The method of claim 1 wherein the ammonia containing material is a compound having a decomposition temperature above 225° F.

3. The method of claim 2 wherein the ammonia containing material is a compound having a decomposition temperature below 300° F.

4. The method of claim 1 wherein the ammonia containing material is relatively insoluble in water.

5. The method of claim 4 wherein the ammonia containing material is an ammonium salt of an organic acid.

6. The method of claim 5 wherein the ammonia containing material is at least partially soluble in water but is encapsulated to delay the decomposition of the compound until the reaction exotherm occurs.

7. The method of claim 1 wherein the ammonia containing material has a decomposition temperature between about 175° F. and 225° F., but is encapsulated to delay the decomposition of the compound until the reaction exotherm occurs.

8. The method of claim 1 wherein the amount of ammonia containing material is sufficient to generate an amount of ammonia which cures substantially all the foam.

9. The method of claim 8 wherein the amount of ammonia containing material is between about 1 and 3 parts by weight of 100 parts polyol.

10. The method of claim 9 wherein the amount of ammonia containing material is between about 1.5 and 2 parts by weight of 100 parts polyol.

11. The method of claim 1 wherein the ammonia containing compound is an ammonia containing zeolite.

12. A method for the rapid cure of flexible, polyether-derived polyurethane foam without adversely affecting the resultant physical properties of said foam, which method comprises:
    adding to a foam-forming composition comprising components of a polyether polyol, an organic isocyanate compound, and water in an amount effective to act as a blowing agent, an encapsulated ammonia containing material;
    forming the foam by reaction of the foam-forming components, thereby generating heat and forming a flexible foam structure which includes therein a small number of unreacted terminal isocyanate groups; and at least partially decomposing said ammonia containing material by exposure to said heat to break through said encapsulation to release ammonia to react with said unreacted isocyanate groups, thus curing the foam.

13. The method of claim 12 wherein the amount of ammonia containing material is sufficient to generate an amount of ammonia which cures substantially all the foam.

14. The method of claim 13 wherein the amount of ammonia containing material is between about 1 and 3 parts by weight of 100 parts polyol.

15. The method of claim 14 wherein the amount of ammonia containing material is between about 1.5 and 2 parts by weight of 100 parts polyol.

16. The method of claim 12 wherein the encapsulated ammonia containing compound is a water soluble ammonia salt of an organic acid.

17. The method of claim 16 wherein the encapsulation is by an epoxy or melamine-formaldehyde resin.

18. A method for the rapid cure of flexible polyether-derived polyurethane foam without adversely affecting the compression set of said foam, which method comprises:
adding an ammonia containing zeolite to a foam-forming composition comprising components of a polyether polyol, an organic isocyanate compound, and water in an amount sufficient to act as a blowing agent;
forming the foam by reaction of the foam-forming components, thereby generating heat and forming a flexible foam structure which includes therein a small number of unreacted terminal isocyanate groups; and
at least partially decomposing the ammonia containing zeolite by exposure to said heat to release ammonia to react with said unreacted isocyanate groups, thus curing the foam.

19. The method of claim 18 wherein the amount of ammonia containing zeolite is sufficient to generate an amount of ammonia which cures substantially all the foam.

20. The method of claim 18 wherein the amount of ammonia containing zeolite is between about 1 and 3 parts by weight of 100 parts of polyol.

21. The method of claim 18 wherein the amount of ammonia containing zeolite is between about 1.5 and 2 parts by weight of 100 parts polyol.

22. A method for the rapid cure of flexible polyether-derived polyurethane foam without adversely affecting the resultant physical properties of said foam, which method comprises:
adding to a foam forming composition comprising components of a conventional, unmodified polyether polyol, an organic isocyanate compound, and water in an amount sufficient to act as a blowing agent, an ammonia containing material having a decomposition temperature below the temperature of the highest reaction exotherm of the foam-forming composition;
forming the foam by reaction of the form-foaming components, thereby generating heat and forming a flexible foam structure which includes therein a small number of unreacted terminal isocyanate groups; and
at least partially decomposing said ammonia containing material by exposure to said heat to release ammonia to react with said unreacted isocyanate groups, thus curing the foam.

23. The method of claim 22 wherein the ammonia containing material is an ammonia salt of an organic acid, an ammonium containing zeolite, or an encapsulated ammonium compound.

24. The method of claim 23 wherein the amount of ammonium containing material is between about 1 and 3 parts by weight of 100 parts polyol.

* * * * *